Dec. 15, 1970
J. MODIN
3,546,947
SPECIFIC GRAVITY METER
Filed Oct. 13, 1969
2 Sheets-Sheet 1
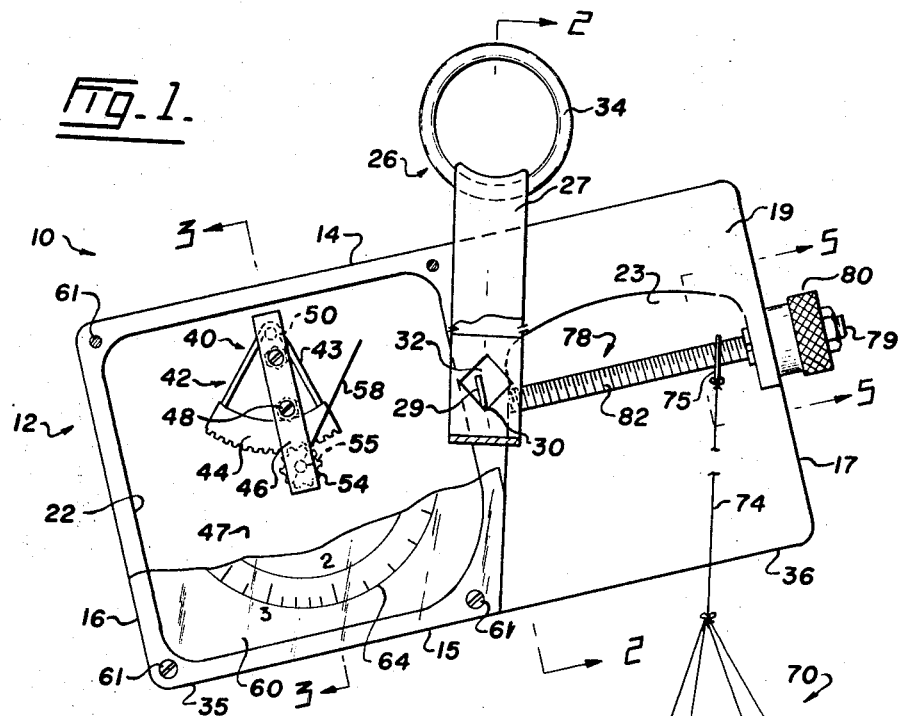
INVENTOR
JOHN MODIN
BY
Fetherstonhaugh & Co.
ATTORNEYS Dec. 15, 1970  J. MODIN  3,546,947
SPECIFIC GRAVITY METER
Filed Oct. 13, 1969
2 Sheets-Sheet 2
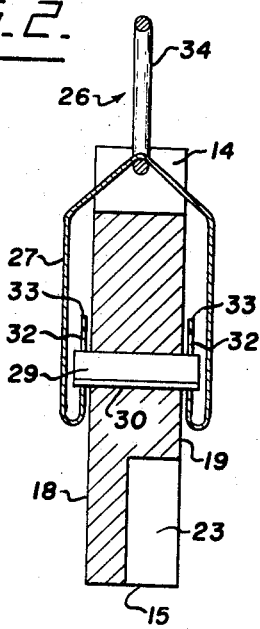
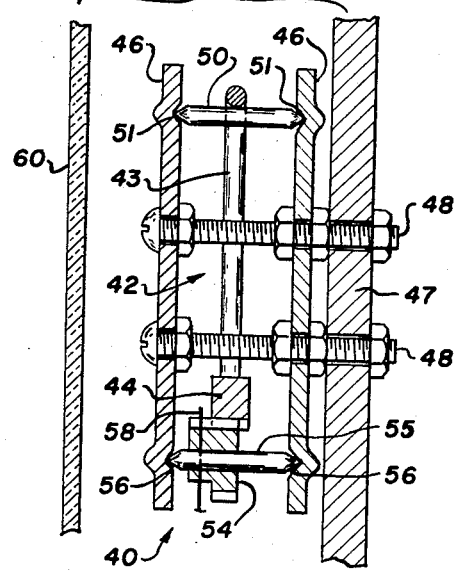
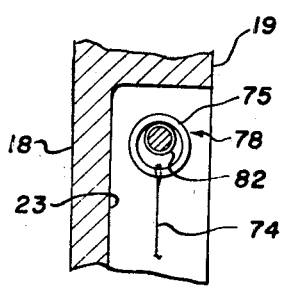
INVENTOR
JOHN MODIN
BY
Featherstonhaugh & Co.
ATTORNEYS

United States Patent Office 3,546,947
Patented Dec. 15, 1970

3,546,947
SPECIFIC GRAVITY METER
John Modin, 1340 Burnaby St., Vancouver,
British Columbia, Canada
Filed Oct. 13, 1969, Ser. No. 865,906
Int. Cl. G01n 9/10; G01g 1/02
U.S. Cl. 73—437          5 Claims

ABSTRACT OF THE DISCLOSURE

An instrument having a balance block fitted with an indicator capable of registering minute changes in the angle of the block as it rocks about a point of pivot. A depending, specimen-supporting sling is secured to a normally overbalanced end of the block by a micrometer bolt which allows the assembly to be adjusted precisely to balance the dry weight of the test specimen, whereupon an accurate specific gravity reading is given when the test specimen is immersed in water.

BACKGROUND OF THE INVENTION

My invention relates to a specific gravity meter which is particularly adapted for use in the field by geologists, prospectors, rock collectors and the like.

The buoyancy method of determining the specific gravity of a solid is well known and a number of such instruments are available for use in the laboratory and in the classroom. Nearly all of these known instruments have some features which make them unsuitable for use elsewhere, for example, some are fitted with springs and require a perfectly steady base if any sort of accuracy is to be assured. Others give information which must be refined by mathematical computation and this can lead to errors. Still others are too heavy or elaborate to be taken into the field or are too delicate to withstand the rough useage to which they are likely to be subjected.

SUMMARY OF THE INVENTION

I have overcome the abovementioned as well as other disadvantages of known specific gravity instruments by providing a direct reading meter which is extremely simple, is ruggedly constructed, and is of sufficiently small size to be conveniently carried in a pocket. The meter can be supported in one hand if necessary to give a reasonably accurate specific gravity reading and a large number of small rock specimens, which geologists and others generally are concerned with, can very quickly be tested. There are no springs or similar parts on the meter which might need servicing or replacement and the few moving parts which might be considered delicate or fragile are completely enclosed and sealed against damage.

BRIEF DESCRIPTION OF THE DRAWINGS

FIG. 1 is a front elevation of the specific gravity meter, in accordance with the present invention, FIG. 2 is a section taken on line 2—2 of FIG. 1, FIG. 3 is an enlarged section taken on the line 3—3 of FIG. 1, FIG. 4 is an elevation of the dial detached from the meter, and FIG. 5 is a fragmentary detail section taken on the line 5—5 of FIG. 1 of the specific gravity meter.

DESCRIPTION OF THE PREFERRED EMBODIMENT

Referring to the drawings, the numeral 10 indicates generally a specific gravity meter which is provided with a rectangular balance block 12. Preferably, block 12 is an aluminum casting for lightness and strength, the block having an upper edge 14, a lower edge 15, side edges 16 and 17, a plane rear face 18, and a parallel front face 19.

Formed in the front face 19 of the block is a substantially square recess 22, see FIG. 1. Another recess 23 (FIGS. 1 and 2) is provided in face 19, this recess being open to the lower edge 15 and side edge 17 of the balance block 12.

Block 12 is intended to be suspended when the meter 10 is in position of use and for this purpose it is provided with suspension means generally indicated at 26. As shown in FIGS. 1 and 2, the suspension means 26 comprises an inverted U-shaped hanger 27 which fits over the upper edge 14 in suitably spaced relation to the faces 18 and 19 of the block. Block 12 is fitted with a horizontal pivot pin 29, the ends of said pin projecting beyond the faces 18 and 19 of the block 12 as shown best in FIG. 2. This pivot pin 29 is formed of hardened steel and has a lower knife edge 30. A substantially diamond-shaped opening 32 is formed in each of the inwardly and upwardly turned lower ends 33 of the hanger 27 and the projecting ends of the pivot pin 29 projects freely through these openings with the knife edge 30 engaging the lowermost corners of said openings as shown in FIG. 1. Thus, the block 12 is mounted to pivot about a horizontal and transversely extending axis which coincides with the knife edge 30. A ring 34 is fitted to the upper end of the hanger 27 to provide convenient means for holding the meter 10 by the fingers or suspending it from a rod supported by a stand or the like.

It should be noticed that the pivot pin 29 is disposed slightly to the right (FIG. 1) of the centre of balance of the block 12. This provides the balance block with a heavy or counterweight end 35 and a relatively light end 36 which normally is overbalanced by said counterweight end. The spacing of the pivot pin 29 from the centre of balance is determined, in part, by the specific gravity range of the articles or specimens which are to be tested by the meter 10. The range of the specific gravity meter illustrated in the drawings is such that it will measure the mass of any solid having a specific gravity between 1 and 12.

Indicator means generally designated by the numeral 40 is mounted in the recess 22. As shown in FIG. 1, and in greater detail in FIG. 3, the means 40 comprises a plumb member 42 which preferably is formed of a substantially A-shaped arm 43 and a relatively heavy, toothed quadrant 44. The member 42 is supported by a pair of transversely spaced uprights 46, see particular FIG. 3, which uprights are secured to bottom wall 47, of the recess 22 by means of a pair of vertically spaced bolts 48, the bolts projecting through the A-shaped arm 43. A needle bearing 50 is welded or otherwise secured within the apex of the arm 43 and the ends of the needle bearing 50 are seated in dimples 51 formed in the opposing faces of the uprights 46. Thus, the plumb member 42 is mounted to swing freely in a vertical plane with a minimum amount of friction being developed. The weight of the toothed quadrant 44 is such that the centre of said quadrant tends to remain directly below the longitudinal axis of the needle bearing 50.

In a similar manner, the uprights 46 support a pinion 54, the teeth of which engage the toothed quadrant 44. Pinion 54 is secured to a needle bearing 55 which is mounted to rotate freely within dimples 56 formed in opposing faces of the upright 46 as before. A radially extending pointer 58 is secured to the pinion 54 to rotate therewith in a vertical plane disposed slightly forward of the plumb member 42. Since all the moving parts of the indicator means 40 are almost completely free from the effects of friction, said means is extremely sensitive and quickly reacts to the rocking movement of the block 12 about the pivot pin 29. Rocking movement of the block 12 in a clockwise direction (FIG. 1) will swing the pointer 58 in the same direction due to the fact that a plumb member 42 remains stationary at this time. The plumb member 42 will rotate the pinion 58 counterclockwise whenever the block 12 is rocked in that direction. Since the pinion 54 is smaller and has fewer teeth than the quadrant 44, the pointer 58 is rotated through a greatly increased arc as compared with the angular movement of the block 12.

The recess 22 is sealed off by means of a clear plastic or glass dial 60, see particularly FIG. 4, so that dirt and moisture cannot reach the indicator means 40 and also so that said means can operate in still air. Screws 61 secure the dial 60 to the front face 19 of the block 12. The dial 60 is provided with a suitably graduated specific gravity scale 64 which carries a dry weight index mark 65, see particularly FIG. 2.

In order to support the specimens to be tested, the meter 10 is provided with a sling generally indicated at 70. As shown in FIG. 1, sling 70 comprises a mesh pocket 72 having a line 73 at each corner thereof. A single vertical line 74 connects the corner line 73 to a nut-like ring 75 which may simply be a thin metal washer or the like, see FIG. 5. The pocket 72 and the lines 73 and 74 of the sling 70 are formed of very fine threads of a suitable material which is impervious to moisture, i.e., a synthetic material such as "nylon" is particularly well suited for this purpose. The lightweight and waterproof sling 70 had practically no effect on the accuracy of the specific gravity reading given by the meter 10.

To attach the sling 70 to the block 12, the overbalanced end 36 is fitted with a micrometer bolt 78, see FIGS. 1 and 5. Bolt 78 is suitably journalled in the block 12 to extend across the upper part of the recess 23 parallel to the block edges 14 and 15. One end 79 of the micrometer bolt projects beyond the side edge 17 of the block and secured to this projecting end is a knurled knob 80 which enables said bolt to be rotated in either direction between the thumb and forefinger. A fine thread 82 is cut on the bolt 78 and the ring 75 encircles said bolt to engage a part of the groove formed by the thread. The internal diameter of the ring 75 deliberately is made considerably larger than the outside diameter of the micrometer bolt 78, see FIG. 5, an arrangement which has been found particularly well suited for a present meter. For example, if a very fine adjustment of the position of the ring 75 is called for, this can be obtained by turning the knob 80. If a large adjustment is needed, the ring 75 can be gripped between the fingers and slipped along the bolt 78 to a desired position thereon.

The operation of the specific gravity meter 10 is based on a well known mathematical formula which may be stated as follows:

$$\text{Specific gravity} = \frac{\text{Weight of substance}}{\text{Weight of same volume of fresh water}}$$

$$\text{or S.G.} = \frac{\text{Weight in air}}{\text{Weight in air} - \text{weight in water}}$$

Therefore, the wet weight is directly proportional to the dry weight and is a ratio thereof. This follows for any weight of all substances.

In operation, the meter 10 is hung by the suspension means 26 and a test specimen 85, see FIG. 1, is placed in the pocket 72 of the sling. The weight of the specimen 85 will cause the block 12 to rock about the pivot pin 29 and, since the plumb member 42 remains stationary and vertical, the pinion 54 is rotated to swing the pointer 58 around the scale 64. By use of the micrometer bolt 78, the sling 70 and the specimen 85 supported thereby, are moved towards or away from the centre of balance of the block 12 as required until the outer end of the pointer 58 is positioned directly over the dry weight index mark 65. The sling-supported specimen 85 is then lowered into a container of fresh water (not shown) whereupon the buoyancy of the specimen will cause the block 12 to pivot slightly in counterclockwise direction as viewed in FIG. 1. Again, the plumb member 42 remains vertical and stationary and the pinion 54 is rotated counterclockwise also to position the pointer 58 over the appropriate specific gravity marking on the scale 64 to complete the test.

If the balance block 12 is rocked about the horizontal and transversely extending axis provided by the knife edge 30 of the pivot pin through a given arc of say, 10° by a 4 ounce specimen spaced 1 inch from the centre of balance of the block; then said block will also be rocked 10° by a 2 ounce specimen of the same substance spaced 2 inches of the centre of balance. When these 2 and 4 ounce weights of the same substance are separately immersed in water as above described, the balance block 12 will rock in the opposite direction through identical but smaller arcs. Thus, the meter 10 can give a reasonably accurate specific gravity reading regardless of the weight of the specimen, assuming of course, that it is within the range of the instrument.

From the foregoing, it will be apparent I have provided a simple yet extremely effective instrument for measuring specific gravity. The device is small, sturdy, light and compact so that mineralogists and others can carry it about in a pocket of their clothing ready for instant use in the field. A very high degree of resolution is made possibly by eliminating the use of springs, as well as all unnecessary moving parts, and mounting the balance block on a simplified suspension means including the hardened steel knife edge.

I claim:

1. A specific gravity meter comprising a balance block mountable to pivot about a horizontal and transversely extending axis disposed to one side of the centre of balance thereof to provide said balance block with a counterweight end and a normally overbalanced end, indicator means carried by the balance block for registering specific gravity, a plumb member which maintains a substantially vertical position when the balance block is rocked about the pivotal axis, means activated by relative movement between said plumb member and said balance block for actuating said indicator means a sling depending below the balance block to support a test specimen, adjustable means on the overbalanced end for securing the sling to the balance block and selectively moving said sling and the test specimen towards and away from the centre of balance to bring said balance block substantially to balance, said plumb member actuating the indicator means when the balance block is brought to balance initially to indicate when a proper point of balance is reached and subsequently to register specific gravity when the test specimen is immersed in water.

2. A specific gravity meter as claimed in claim 1, in which said plumb member comprises an arm pivotally secured at one end to the balance body to swing in a vertical plane a toothed quadrant on the opposite end of the arm, said indicator means also including a pinion rotatably mounted on the balance block in engagement with the toothed quadrant, a pointer mounted on the pinion to rotate therewith, and a specific gravity scale carried by the balance block in a position to be swept by the pointer.

3. A specific gravity meter as claimed in claim 1, in which said adjustable means comprises a micrometer bolt rotatably mounted on the normally overbalanced end of the balance block, and a nut-like ring secured to the upper end of the sling to encircle the micrometer bolt and engage the threads thereof.

4. A specific gravity meter as claimed in claim 3, in which said sling is formed of lightweight, waterproof threads interconnected to provide a mesh pocket and lines connecting said mesh pocket to the nut-like ring.

5. A specific gravity meter comprising a balance block mountable to pivot about a horizontal and transversely extending axis disposed to one side of the centre of balance thereof to provide said balance block with a counterweight end and a normally overbalanced end, indicator means carried by the balance block to register specific gravity, said indicator means including a plumb member which maintains a substantially vertical position when the balance block is rocked about the pivotal axis, a toothed quadrant on the plumb member, a pinion rotatably mounted on the balance block in engagement with the toothed quadrant, a pointer mounted on the pinion to rotate therewith, a specific gravity scale carried by the balance block to be swept by the pointer, a sling depending below the balance block to support a test specimen, a micrometer bolt rotatably mounted on the overbalanced end of the balance block, a nut-like ring secured to the upper end of the sling to encircle the micrometer bolt and engage the threads thereof, said sling and the test specimen being movable by the micrometer bolt towards and away from the centre of balance to bring the balance block substantially to balance, said plumb member rotating the pinion and the pointer when the balance is brought to balance initially to indicate when a proper point of balance is reached and subsequently to register specific gravity when the test specimen is immersed in water.

References Cited
UNITED STATES PATENTS

| | | | |
|---|---|---|---|
| 945,329 | 1/1910 | Jolly | 73—437 |
| 1,072,952 | 9/1913 | Jolly | 73—435 |

FOREIGN PATENTS

| | | | |
|---|---|---|---|
| 492,361 | 2/1930 | Germany | 73—437 |
| 411,707 | 3/1945 | Italy | 177—216 |

RICHARD C. QUEISSER, Primary Examiner

C. E. SNEE III, Assistant Examiner

U.S. Cl. X.R.

177—216